(12) United States Patent
Das et al.

(10) Patent No.: US 10,264,031 B2
(45) Date of Patent: Apr. 16, 2019

(54) METHODS AND SYSTEMS FOR VIRTUAL CONFERENCE SYSTEM USING PERSONAL COMMUNICATION DEVICES

(71) Applicant: QUALCOMM Incorporated, San Diego, CA (US)

(72) Inventors: Soumya Das, San Diego, CA (US); Karthika Paladugu, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/828,100

(22) Filed: Nov. 30, 2017

(65) Prior Publication Data
US 2018/0091560 A1     Mar. 29, 2018

Related U.S. Application Data

(62) Division of application No. 14/820,421, filed on Aug. 6, 2015, now Pat. No. 9,866,596.

(51) Int. Cl.
*H04L 29/06* (2006.01)
*H04L 29/08* (2006.01)
*H04W 4/80* (2018.01)

(52) U.S. Cl.
CPC ........ *H04L 65/1059* (2013.01); *H04L 65/403* (2013.01); *H04L 65/605* (2013.01); *H04L 65/80* (2013.01); *H04L 67/104* (2013.01); *H04W 4/80* (2018.02); *H04L 67/1051* (2013.01); *H04L 67/14* (2013.01)

(58) Field of Classification Search
None
See application file for complete search history.

(56) References Cited

U.S. PATENT DOCUMENTS 6,580,793 B1    6/2003  Dunn et al.
6,751,187 B2    6/2004  Walton et al.
(Continued)

FOREIGN PATENT DOCUMENTS

GB          2457254 A       8/2009
WO    WO-2008043002 A2     4/2008
(Continued)

OTHER PUBLICATIONS

International Search Report and Written Opinion—PCT/US2016/044266—ISA/EPO—dated Jan. 20, 2017.
(Continued)

*Primary Examiner* — Ayaz R Sheikh
*Assistant Examiner* — Faiyazkhan Ghafoerkhan
(74) *Attorney, Agent, or Firm* — Paradice and Li LLP/Qualcomm (57) ABSTRACT

A method for managing jitter includes determining, by a processor of a master device, at least one of device capabilities of at least one satellite device, device capabilities of the master device, or channel conditions; determining, by the processor of the master device, a de-jitter buffer size based on the at least one of the device capabilities of the at least one satellite device, the device capabilities of the master device, or the channel conditions; and applying, by the processor of the master device, de-jitter buffer having the determined de-jitter buffer size.

20 Claims, 8 Drawing Sheets

(56) References Cited

U.S. PATENT DOCUMENTS

| | | |
|---|---|---|
| 7,143,177 B1 | 11/2006 | Johnson et al. |
| 7,166,062 B1 | 1/2007 | Watterson et al. |
| 7,551,647 B2 | 6/2009 | Fellman et al. |
| 7,792,158 B1 | 9/2010 | Cho et al. |
| 7,949,890 B2 | 5/2011 | Vonog et al. |
| 8,107,502 B2 | 1/2012 | Darras et al. |
| 8,346,160 B2 | 1/2013 | Kummetz |
| 8,391,320 B2 | 3/2013 | Lubbs et al. |
| 8,422,409 B2 | 4/2013 | Guo et al. |
| 8,645,741 B2 | 2/2014 | Vonog et al. |
| 8,693,363 B2 * | 4/2014 | Ericson ............ H04L 1/1825 370/252 |
| 8,873,543 B2 * | 10/2014 | Hua ................ H04L 65/80 370/352 |
| 8,990,305 B2 | 3/2015 | Barkley et al. |
| 9,094,564 B2 | 7/2015 | Soldan |
| 9,203,633 B2 | 12/2015 | Chu et al. |
| 9,516,476 B2 | 12/2016 | Milosevski et al. |
| 9,866,596 B2 * | 1/2018 | Das ................ H04L 65/605 |
| 2002/0103919 A1 | 8/2002 | Hannaway |
| 2002/0163932 A1 | 11/2002 | Fischer et al. |
| 2003/0053416 A1 | 3/2003 | Ribas-Corbera et al. |
| 2004/0006595 A1 | 1/2004 | Yeh et al. |
| 2005/0058146 A1 | 3/2005 | Liu et al. |
| 2005/0074061 A1 | 4/2005 | Ribas-Corbera et al. |
| 2005/0213737 A1 * | 9/2005 | Rodman ............ H04L 12/1813 379/202.01 |
| 2007/0021138 A1 | 1/2007 | Allen et al. |
| 2007/0298823 A1 | 12/2007 | Sherif et al. |
| 2008/0063216 A1 | 3/2008 | Sakata et al. |
| 2008/0084900 A1 | 4/2008 | Dunn |
| 2008/0162127 A1 | 7/2008 | Laaksonen et al. |
| 2008/0177893 A1 | 7/2008 | Bowra et al. |
| 2008/0219259 A1 * | 9/2008 | McDonald ............ H04W 76/45 370/390 |
| 2008/0298266 A1 | 12/2008 | Chang et al. |
| 2008/0298398 A1 | 12/2008 | Eidson |
| 2008/0304653 A1 | 12/2008 | Ghani et al. |
| 2009/0010228 A1 | 1/2009 | Wang et al. |
| 2010/0034201 A1 * | 2/2010 | Barave ............ H04L 12/1822 370/389 |
| 2010/0265834 A1 | 10/2010 | Michaelis et al. |
| 2010/0323742 A1 | 12/2010 | Allen et al. |
| 2011/0080977 A1 * | 4/2011 | Liu ................ H04W 72/005 375/316 |
| 2011/0103377 A1 * | 5/2011 | Hua ................ H04L 65/80 370/352 |
| 2011/0187813 A1 | 8/2011 | Musgrave |
| 2011/0200183 A1 | 8/2011 | Erhart et al. |
| 2011/0258474 A1 | 10/2011 | Vonog et al. |
| 2011/0262133 A1 | 10/2011 | Yuan |
| 2012/0016926 A1 * | 1/2012 | Toga ................ H04L 12/00 709/203 |
| 2012/0026987 A1 * | 2/2012 | Jain ................ H04W 74/0866 370/336 |
| 2012/0185291 A1 * | 7/2012 | Ramaswamy ..... G06Q 10/1095 705/7.19 |
| 2012/0263195 A1 | 10/2012 | Li et al. |
| 2012/0300769 A1 | 11/2012 | Narbutt |
| 2012/0304079 A1 | 11/2012 | Rideout et al. |
| 2012/0314598 A1 | 12/2012 | Sadek et al. |
| 2012/0327173 A1 | 12/2012 | Couse et al. |
| 2013/0002797 A1 | 1/2013 | Thapa et al. |
| 2013/0165173 A1 | 6/2013 | Allen et al. |
| 2013/0195276 A1 | 8/2013 | Ojala et al. |
| 2013/0222519 A1 * | 8/2013 | Lee ............ H04N 7/15 348/14.02 |
| 2014/0022332 A1 * | 1/2014 | Wang ............ H04M 3/567 348/14.07 |
| 2014/0028498 A1 | 1/2014 | Lin et al. |
| 2014/0064165 A1 | 3/2014 | Chung et al. |
| 2014/0111604 A1 | 4/2014 | Vonog et al. |
| 2014/0156592 A1 | 6/2014 | Bank et al. |
| 2014/0164545 A1 | 6/2014 | Davis et al. |
| 2014/0168354 A1 | 6/2014 | Clavel et al. |
| 2014/0320698 A1 | 10/2014 | Karivaradaswamy et al. |
| 2014/0323036 A1 | 10/2014 | Daley et al. |
| 2014/0376545 A1 | 12/2014 | Hua et al. |
| 2015/0050967 A1 | 2/2015 | Bao et al. |
| 2015/0113403 A1 | 4/2015 | Harvey et al. |
| 2015/0120953 A1 | 4/2015 | Crowe et al. |
| 2015/0222677 A1 | 8/2015 | Couse et al. |
| 2015/0304607 A1 | 10/2015 | Bader-Natal et al. |
| 2016/0014373 A1 | 1/2016 | Lafata et al. |
| 2016/0019376 A1 | 1/2016 | Karaoguz et al. |
| 2016/0134428 A1 | 5/2016 | Ouyang et al. |
| 2016/0142840 A1 * | 5/2016 | Das ............ H04L 43/087 381/83 |
| 2016/0191258 A1 * | 6/2016 | Oyman ............ H04L 12/189 370/312 |
| 2016/0205155 A1 | 7/2016 | Rist et al. |
| 2016/0262087 A1 * | 9/2016 | Thondapu ............ H04W 48/06 |
| 2016/0302224 A1 | 10/2016 | Khairmode et al. |
| 2017/0041252 A1 * | 2/2017 | Das ................ H04L 65/605 |
| 2017/0041357 A1 | 2/2017 | Wang et al. |
| 2017/0041358 A1 | 2/2017 | Wang et al. |
| 2017/0295029 A1 * | 10/2017 | Li ................ H04W 56/00 |

FOREIGN PATENT DOCUMENTS

| | | |
|---|---|---|
| WO | WO-2009139903 A1 | 11/2009 |
| WO | WO-2014043405 A1 | 3/2014 |
| WO | WO-2016077251 A1 | 5/2016 |

OTHER PUBLICATIONS

Vita J., et al., "Dynamic Adaptation of the Jitter Buffer for Video Streaming Applicants," IEEE 2nd Workshop on Advances in Information, Electronic and Electrical Engineering (AIEEE), Nov. 28, 2014, pp. 1-4, XP032729536, DOI: 10.1109/AIEEE.2014.7020318.

\* cited by examiner

| Channel Conditions | QoS on Satellite Device | QoS on Master Device | Personal Communication Device (PCD) Bluetooth On | Dejitter Buffer Size |
|---|---|---|---|---|
| 2.4 GHz | NO | NO | NO | 80 ms |
| 2.4 GHz | YES | NO | NO | 60 ms |
| 2.4 GHz | NO | NO | YES | 100 ms |
| 5 GHz | NO | NO | NO | 60 ms |

METHODS AND SYSTEMS FOR VIRTUAL CONFERENCE SYSTEM USING PERSONAL COMMUNICATION DEVICES

CROSS-REFERENCE TO RELATED PATENT APPLICATIONS

This application is a divisional of, and claims priority to, U.S. application Ser. No. 14/820,421 entitled "METHODS AND SYSTEMS FOR VIRTUAL CONFERENCE SYSTEM USING PERSONAL COMMUNICATION DEVICES" filed on Aug. 6, 2015, assigned to the assignee hereof. This application also relates to U.S. application Ser. No. 14/820,363 entitled "METHODS AND SYSTEMS FOR VIRTUAL CONFERENCE SYSTEM USING PERSONAL COMMUNICATION DEVICES" filed on Aug. 6, 2015 and to U.S. application Ser. No. 14/820,371 entitled "METHODS AND SYSTEMS FOR VIRTUAL CONFERENCE SYSTEM USING PERSONAL COMMUNICATION DEVICES" filed on Aug. 6, 2015, both assigned to the assignee hereof. The disclosures of all prior Applications are considered part of and are incorporated by reference in this Patent Application.

TECHNICAL FIELD

Embodiments described herein generally relate to a Virtual Conference System (VCS). In particular, this disclosure relates to using Personal Communication Devices (PCDs) as input and output devices for the VCS.

DESCRIPTION OF THE RELATED TECHNOLOGY

A traditional conference system in a given venue may include at least one display screen, microphone, and speaker. The displaying screen displays visual output to attendees in the venue. The microphone captures audio data. The speaker outputs audio data to the attendees in the venue. Various issues confront the traditional conference system. For example, depending on where each attendee is positioned in the venue, some attendees may not be able to see the display screen, access the microphone, or hear the speaker, due to distance or view obstruction. Furthermore, unavailability of the traditional conference system (e.g., when the traditional conference system fails to function or when the traditional conference system is not present in the venue) can prevent the conference from occurring at that venue. Therefore, the traditional conference system may produce negative user experience in various situations.

SUMMARY

In some embodiments, a method for managing jitter in a virtual conference system having a master device connected to a plurality of satellite devices is described. The method includes determining, by a processor of the master device, at least one of (1) device capabilities of at least one of the plurality of satellite devices, (2) device capabilities of the master device, or (3) channel conditions. The processor of the master device determines a de-jitter buffer size based on the at least one of the device capabilities of the satellite device, the device capabilities of the master device, or the channel conditions. The processor of the master device applies a de-jitter buffer having the determined de-jitter buffer size.

Some embodiments relate to a system for managing jitter in a virtual conference system having a master device connected to a plurality of satellite devices. The system includes a processor of the master device configured to determine at least one of (1) device capabilities of at least one of the plurality of satellite devices, (2) device capabilities of the master device, or (3) channel conditions, determine a de-jitter buffer size based on the at least one of the device capabilities of the satellite device, the device capabilities of the master device, or the channel conditions, and determine de-jitter buffer having the determined de-jitter buffer size.

Some embodiments relate to a non-transitory computer readable-medium containing computer instructions such that, when executed, causes a processor of a master device to perform a process of managing jitter in a virtual conference system having the master device connected to a plurality of satellite devices. The process includes determining at least one of (1) device capabilities of at least one of the plurality of satellite devices, (2) device capabilities of the master device, or (3) channel conditions, determining a de-jitter buffer size based on the at least one of the device capabilities of the satellite device, the device capabilities of the master device, or the channel conditions, and determining de-jitter buffer having the determined de-jitter buffer size.

Some embodiments relate to a method for communication in a virtual conference system having a master device connected to a satellite device. The method includes determining, by a processor of the satellite device, a priority associated with an audio frame based on energy associated with that audio frame, determining, by the processor of the satellite device, at least one of retransmission count or buffer packet discard for the audio frame based on the priority, and transmitting, by a network device of the satellite device as configured by the processor of the satellite device, the audio frame based on the at least one of the retransmission count or buffer packet discard to the master device.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Referring generally to the FIGS., a Virtual Conference System (VCS) may be the next generation of conference systems. The VCS may include satellite devices, remote devices, and a master device. Each of the satellite devices, remote devices, and master device may be implemented with a Personal Communication Device (PCD), such as, but not limited to, a mobile device, smartphone, and the like. The satellite device may be used for receiving and/or sending data with other users at a venue (e.g., a conference room or meeting site). For example, the satellite device may be used as a display, speaker, and microphone to achieve such purpose. The remote devices may be used similarly, but by users outside of the venue. The master device may receive audio/video data from satellite and/or remote devices. The master device may likewise capture audio/video data with its own microphone and camera. The master device may also relay (processed, mixed, filtered, and the like) audio/video data to the satellite devices and/or remote devices for outputting to the users of the satellite devices and/or the remote devices. The master device may centrally perform audio/video data processing functions such as mixing, reverberation control, channel selection, filtering, echo cancellation, buffer selection, and the like.

Accordingly, the VCS can be advantageous over any traditional conference system. In particular, given that PCDs are so pervasive, the conference can occur in any venue as long as the attendees/users have their PCDs with them. In addition, each attendee/user may closely perceive output data (e.g., visual data from the displays of the PCDs and audio data from the speaker of the PCDs). Therefore, the VCS as described herein can address the negative user experience of the traditional conference system, caused by an inability of the users to access audiovisual output or input.

While various embodiments described herein may relate to audio data, one of ordinary skill in the art can appreciate that systems and methods described herein may be similarly implemented for video or other types of data.

Figure 1:
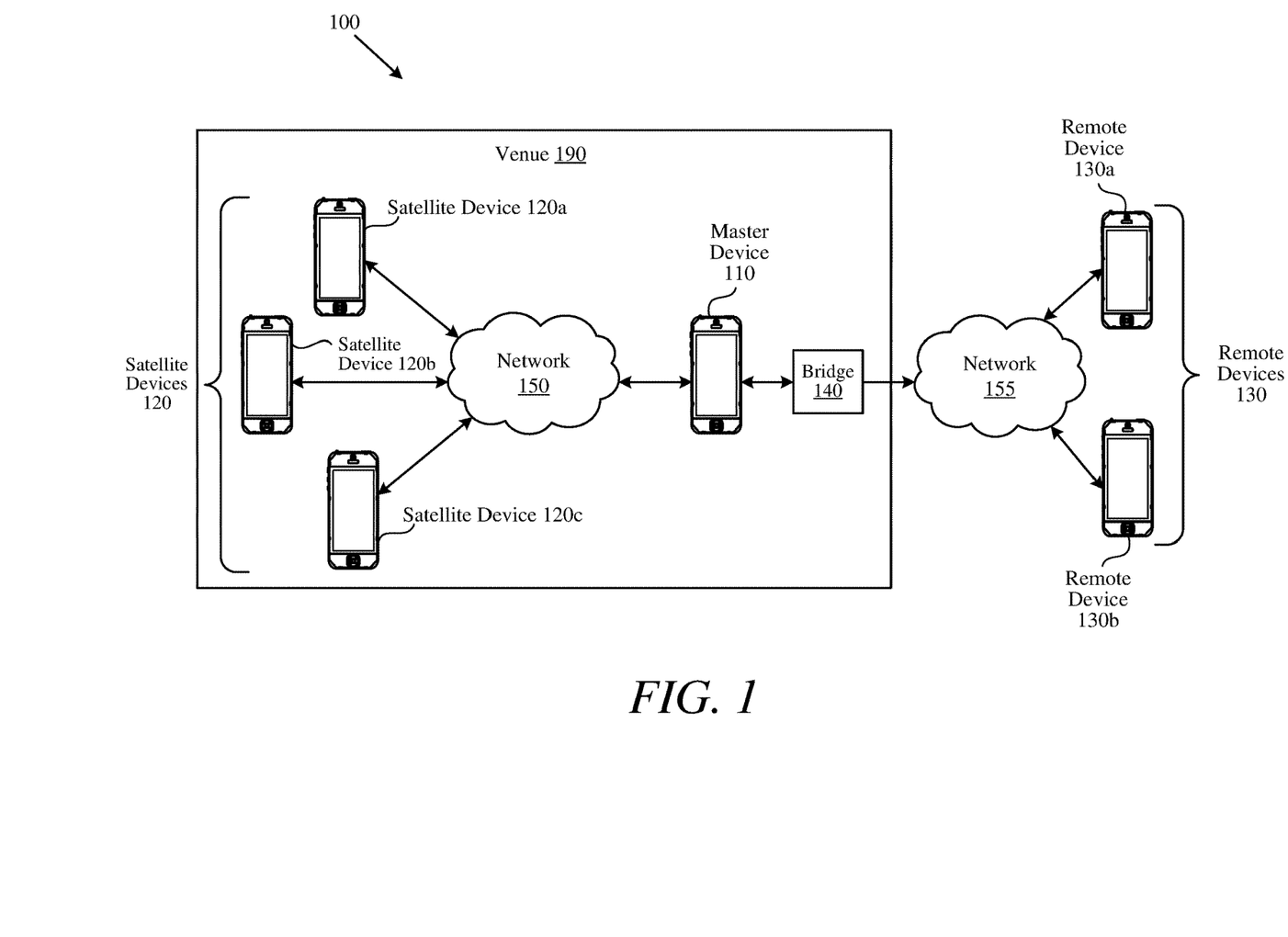
FIG. 1 is a diagram illustrating an example of a Virtual Conference System (VCS) according to various embodiments.

FIG. 1 is a diagram illustrating an example of a VCS 100 according to various embodiments. Referring to FIG. 1, the VCS 100 may include of at least one satellite device (e.g., the satellite devices 120a-120c, collectively, the satellite devices 120), at least one remote device (e.g., the remote devices 130a-130b, collectively, the remote devices 130), and a master device 110. The master device 110 and the satellite devices 120 as well as the associated users may be physically located in a venue 190 (at least for the peer discovery process). For example, the master device 110 and the satellites devices 120 may be connected to the network 150 through a wireless access point that is physically located within the venue 190 (for the peer discovery process). In additional embodiments, the network 150 may be implemented with a WiFi Direct network as described herein. The master device 110 may be coupled to or otherwise include a bridge 140. In some embodiments, the bridge 140 is physically located in the venue 190. In other embodiments, the bridge 140 is not physically located in the venue 190 but may be in communication with the master device 110.

In some embodiments, the master device 110 and the satellite devices 120 may be collectively referred to as "near-end" devices. The remote devices 130 may be referred to as "far-end" devices. In such embodiments, the near-end devices may be centralized with respect to the master device 110. The master device 110 may connect to the virtual conference through the bridge 140, to which other parties (the far-end devices) may also be connected to. In addition, the far-end devices may also implement the master-satellite configuration of the near-end devices. For example, two or more master devices 110 may be connected to the bridge 140. Each of the master devices 110 may be connected to a separate group (i.e., in a separate venue 190) of satellite devices 120. In other embodiments, the master device 110 may also function as the bridge 140 and directly connected to the remote devices 130 via the network 155.

The satellite devices 120 and the master device 110 may be connected to one another through a network 150. The network 150 may be any wired or wireless network including, but not limited to, a WiFi network, Bluetooth network, Long Term Evolution (LTE) network (or other suitable types of mobile data network), a combination thereof, and/or the like. The remote devices 130 and the bridge 140 may be connected to one another through a network 155. The network 155 may be any wired or wireless network including, but not limited to, a WiFi network, LTE network (or other suitable types of mobile data network), a combination thereof, and/or the like. In particular, the LTE network may be a LTE small cell. WiFi network may additional be a WiFi Direct network. In some embodiments, the network 150 and the network 155 may be different networks. In other embodiments, the network 150 and the network 155 may be a same network. In some embodiments, the master device 110 and the bridge 140 may be connected to each other through the network 150. In other embodiments, the master device 110 and the bridge 140 may be connected to each other through the network 155 or another suitable network.

The venue 190 may be any suitable location that a conference can take place. For example, the venue 190 may refer to a meeting room, classroom, conference hall, lecture hall, and any suitable space in which a conference may be conducted. In addition, the venue 190 may be a space in which reverberation, howling, staggered sound, and the like may negatively impact the master device 110 and the satellite devices 120. The venue 190 may be occupied by at least the satellite devices 120, the master device 110, and their respective users (if any). The remote devices 130 (and their respective users), on the other hand, may be located anywhere outside of the boundaries of the venue 190. In particular, the users of the remote devices 130 may not be able to perceive output from the satellite devices 120.

Figure 2:
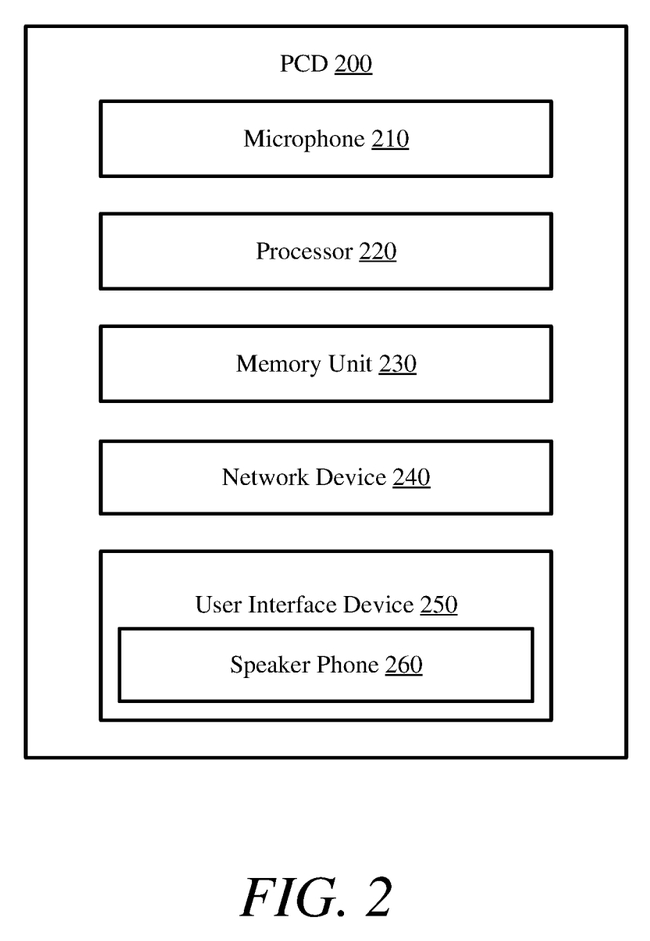
FIG. 2 is a block diagram illustrating an example of a Personal Communication Device (PCD) for implementation within the VCS according to various embodiments.

FIG. 2 is a block diagram illustrating an example of a PCD 200 for implementation in the VCS 100 according to various embodiments. Referring to FIGS. 1-2, one or more of the master device 110, satellite devices 120, and remote devices 120 may be implemented with the PCD 200. In particular embodiments, all of the master device 110, satellite devices 120, and remote devices 120 may be implemented with the PCD 200. The PCD 200 may be an electronic mobile device configured to capture and output audio data. In further embodiments, the PCD 200 may be configured to capture and output visual data (e.g., photographs, videos, and the like). Examples of the PCD 200 may include, but are not limited to, smartphones (mobile phones), pagers, tablets, PDAs, any mobile computing systems, and/or the like. The PCD 200 may be any mobile or non-mobile processor devices such as, but not limited to, a desktop computer, mainframe computer, laptop computer, and the like. The PCD 200 may include a microphone 210, processor 220, memory unit 230, network device 240, and a user interface device 250.

In some embodiments, the microphone 210 may be configured to capture sound from a user of the PCD 200 as the user speaks. In some embodiments, the microphone 210 may be integrated with the PCD 200 or otherwise housed inside of a housing of the PCD 200. In other embodiments, the at least one microphone 210 may be an auxiliary microphone not integrated with the PCD 200, but is operatively coupled to the PCD 200 in any suitable manner. The microphone 210 may capture Post Code Modulation (PCM) audio samples. Such PCM audio samples may be transmitted at uplink from the satellite devices 120 to the master device 110 through the network 150.

The processor 220 may be operatively coupled to the memory unit 230 for performing the functions of the PCD 200 described herein. For example, the processor 220 and the memory unit 230 may be configured to perform functions of the PCD 200 as described in the disclosure. The processor 220 may include any suitable data processing device, such as a general-purpose processor (e.g., a microprocessor). In the alternative, the processor 220 may be any conventional processor, controller, microcontroller, or state machine. The processor 220 may also be implemented as a combination of computing devices, e.g., a combination of a Digital Signal Processor (DSP) and a microprocessor, a plurality of microprocessors, at least one microprocessors in conjunction with a DSP core, or any other such configuration.

The memory unit 230 may be operatively coupled to the processor 220 and may include any suitable device for storing software and data for controlling and use by the processor 20 to perform operations and functions described herein, including, but not limited to, Random Access Memory (RAM), Read Only Memory (ROM), floppy disks, hard disks, dongles, or other Recomp Sensor Board (RSB) connected memory devices, or the like.

The network device 240 may include interface software and hardware for accessing the network 150 and/or the network 155 such that data may be transmitted and received via the network 150 and/or the network 155. The network device 240 may include at least one wireless receiver, transmitter, transceiver, and/or the like. The network device 240 may also include software providing a wireless or wireless communication link with the network 130.

The user interface 250 may include a display device and a user input device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. In particular embodiments, the display device of the user interface 250 may include a speaker (e.g., the speaker phone 260) for outputting sound and a display screen for outputting visual data.

The user input device may include any suitable device that may receive input from a user including, but not limited to one or more manual operator (such as, but not limited to a switch, button, touchscreen, knob, slider or the like), camera, image sensor, Radio Frequency Identification (RFID) tag reader, or the like. In particular embodiments, the user input device of the user interface 250 may include the camera for capturing visual data.

The PCD 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various signals, e.g., for global positioning system (GPS) communication, WiFi communication, code division multiple access (CDMA) communication, time division multiple access (TDMA), frequency division multiple access (FDMA), LTE communication, frequency modulation (FM) communication, BT communication, near field communication (NFC), and the like. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware specifically configured for performing operations described herein. Hardware and/or software for the functions may be incorporated in the PCD 200 during manufacturing, for example, as part of the original manufacturer's configuration of the PCD 200. In further embodiments, such hardware and/or software may be added to the PCD 200, after original manufacturing, such as by, but not limited to, installing one or more software applications onto the PCD 200.

With respect to users of the satellite devices 120, audio may find its way into ears of the users of the satellite devices 120 in two paths: (1) a first path from the speaker's mouth directly into the user's ears, and (2) a second path from the speaker's mouth to the satellite device 120a, then through the network 150 to another satellite device 120b, which may output the audio data through the speakers to the user. This may cause reverberation or echo-like phenomenon that negatively impact user experience. In addition, howling may also be caused by the two different audio paths.

The master device 110 may be configured to receive audio and/or visual data from the satellite devices 120. The master device 110 may select one of the satellite devices 120 for output. The master device 110 may also mix outputs from two or more of the satellite devices 120 for output. The selected and/or mixed channels may be outputted to the satellite devices 120 by the master device 110. In some embodiments, signals obtained from a selected satellite device may not be played back at the same selected satellite device. In other words, when a satellite device is selected by the master device 110, that satellite device does not play back the signals that it captured. The master device 110 may transmit an indication to the originating satellite device indicating that output data is not to be outputted. This can suppress echo-like output and howling at the selected satellite device.

The VCS 100 may be configured for (1) de-jitter buffer size selection, (2) adaptive retransmission at the MAC layer, and (3) adaptive switching between WiFi multicast and unicast.

Given the complexity and the processing power of the PCD 200 as compared to simple microphone, speaker, and display in the traditional conferencing system, various aspects of a virtual conference may benefit from usage of the PCDs 200 and the master-satellite configuration. For example, as multiple satellite devices 120 may be present in the venue 190, the satellite device having the best audio quality (e.g., measured based on a signal-to-noise ratio (SNR) or the like) may be selected at uplink. In some embodiments, the master device 110 may perform dual functions of the master device 110 and the satellite devices 120. In other embodiments, the master device 110 may perform purely signal processing functions and may not capture/output data.

Accordingly, the master device 110 may be a digital signal processing center for the near-end devices. In other words, the master device 110 may provide an interface for the satellite devices 120 with the bridge 140 (in turn, the remote devices 130). For the near-end devices, the bridge 140 may only need to interface with the master device 110 while still benefit from advantages of using the satellite devices 120 (the PCDs 200) as microphone and/or display.

As referred to herein, downlink data packets may refer to suitable types of data, signals, and/or information being transmitted from the master device 110 to the satellite devices 120 (and the remote devices 130). Uplink data packets may refer to suitable types of data, signals, and/or information being transmitted from the satellite devices 120 (and the remote devices 130) to the master device 110. While embodiments may be described with respect to the satellite devices 120, one of ordinary skill in the art can appreciate that similar embodiments may likewise be applied with respect to the remote devices 130.

De-jitter buffers may be implemented in the VCS 100 using PCDs 200 as the master device 110 and the satellite devices 120. Jitter may refer to variations in latency of the (uplink and/or downlink) data packets received at a receiver (e.g., the master device 110, the satellite devices 120, or the remote devices 130) due to channel errors, interference, congestion in the wireless network 150 (e.g., WiFi, WiFi-direct, long term evolution (LTE), LTE device-to-device (LTED2D), and/or the like). De-jitter buffers may be implemented to smoothen out the playback of the received data packets by providing buffers to be filled up prior to playback. This can increase an initial latency and for any subsequent under-run when the de-jitter buffer empties out. Other times, this ensures continuous playback. It can be beneficial to select an appropriate de-jitter buffer size to closely match the actual jitter due to network conditions. This is because a de-jitter buffer size larger than the appropriate size would increase end-to-end latency. A de-jitter buffer size smaller than the appropriate size may not be sufficient to smoothen the latency variations.

Figure 3:
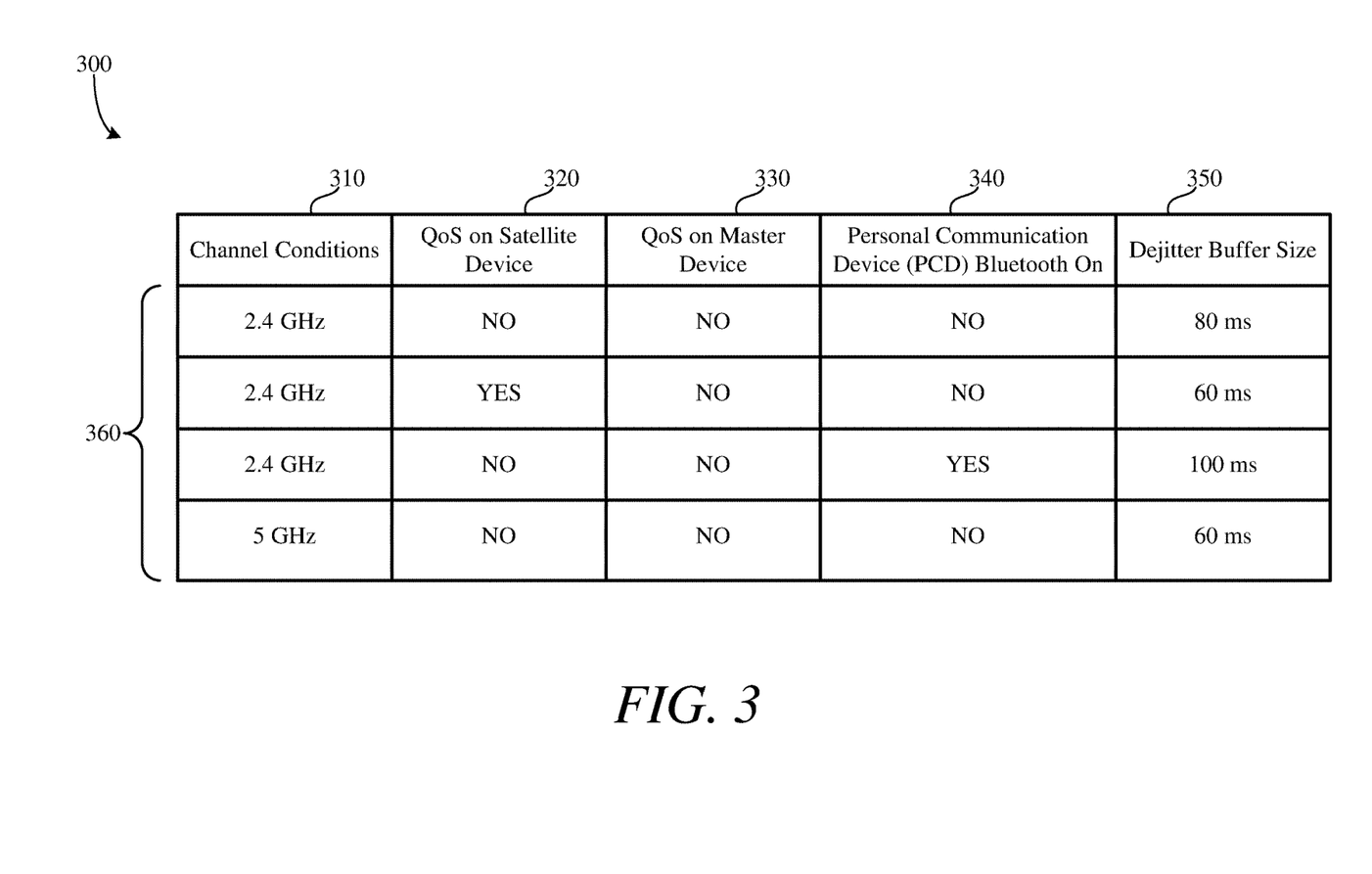
FIG. 3 is a mapping table illustrating examples of predetermined correspondence between the de-jitter buffer size and the wireless link delay variation according to various embodiments.

FIG. 3 is a mapping table 300 illustrating examples of predetermined correspondence between the de-jitter buffer size and the wireless link delay variation according to various embodiments. Referring to FIGS. 1-3, the mapping table 300 may include a de-jitter buffer size column 350 containing predetermined de-jitter buffer sizes that correspond to various wireless link delay variations (as set forth in columns 310-340). The mapping table 300 may also include channel conditions column 310 filled with WiFi operating channel types. The mapping table 300 may additionally include a satellite quality of service (QoS) QoS column 320 and a master QoS column 330 indicating whether QoS is supported on the satellite device 120*a* or the master device 110, respectively. Furthermore, the mapping table 300 may include a PCD Bluetooth column 340 indicating whether Bluetooth is enabled and activated on the satellite device 120*a*. Each of the rows 360 may present a unique set of wireless link delay variations corresponding to a predetermined de-jitter buffer size.

For example, as compared to the 5 GHz channel, the 2.4 GHz channel may be associated with more channel overlap and higher network delay. The deployed access point may or may not support QoS for the network 150. Even when QoS is supported by the network 150 and the access point, one or more of the satellite device 120*a* (satellite devices 120) or master device 110 may not support QoS. Activated Bluetooth on a device may also generate interference with the 2.4 GHz channel on WiFi.

For example, a de-jitter buffer size of 80 ms may be selected when the 2.4 GHz channel is used while QoS services and Bluetooth are not supported on the master device 110 or the satellite device 120*a*. In another example, a de-jitter buffer size of 60 ms may be selected when the 2.4 GHz channel is used, while QoS is not supported on the master device 110 but is supported on the satellite device 120*a*. Bluetooth is not activated on the satellite device 120*a* for this case. In yet another example, a de-jitter buffer size of 100 ms may be selected when the 2.4 GHz channel is used, Bluetooth is enabled on the satellite device 120*a*, and QoS is not supported on the master device 110 or the satellite device 120*a*. In yet another example, a de-jitter buffer size of 60 ms may be selected when a 5 GHz channel is used while QoS and Bluetooth are not supported on the master device 110 or the satellite device 120*a*. The examples in which neither the master device 110 nor the satellite device 120*a* supports QoS may also correspond to the cases in which the access point does not support QoS for the network 150.

The mapping table 300 may be predetermined and stored in the memory unit 230 of the master device 110. Alternatively, the master device 110 may request or received the mapping table 300 from a server. One of ordinary skills in the art would appreciate that the examples shown in FIG. 3 are non-limiting. Additional channel conditions, device capabilities, or wireless link delay variation may be mapped to a de-jitter buffer size in a manner such as, but not limited to, as illustrated in the mapping table 300.

Figure 4:
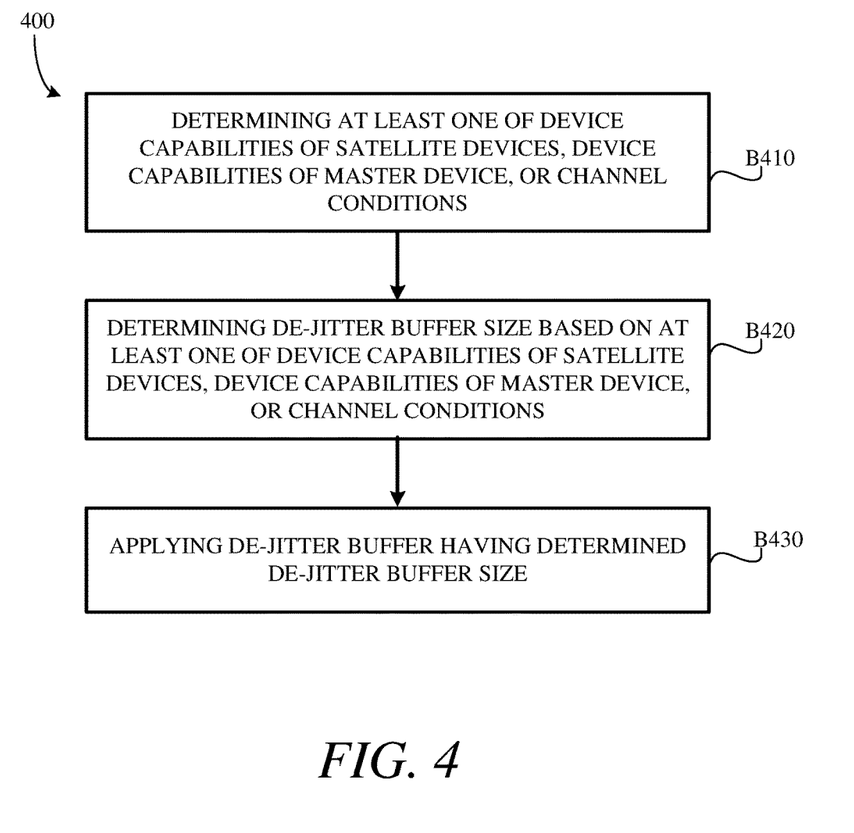
FIG. 4 is a process flowchart illustrating an example of a de-jitter buffer size selection method according to various embodiments.

FIG. 4 is a process flowchart illustrating an example of a de-jitter buffer size selection method 400 according to various embodiments. Referring to FIGS. 1-4, the method 400 may be implemented for the VCS 100, in which at least the master device 110 and the satellite devices 120 may be implemented with the PCD 200. The method 400 may be implemented for the master device 110. The method 400 may be performed by the processor 220 (as coupled to the network device 240 and the memory device 230) of the master device 110.

At block B410, the processor 220 of the master device 110 may determine at least one of device capabilities of the satellite device 120*a* (i.e., each of the plurality satellite devices 120), the device capabilities of the master device 110, or channel conditions. In some embodiments, the device capabilities of the satellite device 120*a* may include whether QoS is supported on the satellite device 120*a*, whether Bluetooth is activated on the satellite device 120*a*, and the like. In some embodiments, the device capabilities of the master device 110 may include whether QoS is supported on the master device 110. The device capabilities of the master device 110 may be determined locally by the processor 220 of the master device 110. The device capabilities of the master device 110 may be stored in the memory unit 230 of the master device 110 for repeated use. The channel conditions may include network environmental factors such as, but not limited to, types of channel (e.g., which of the 2.4 GHz channel or the 5 GHz is being used) associated with the network 150 (e.g., WiFi), and the like.

The network 150 may include a first channel from the satellite device 120*a* to the WiFi access point and a second channel from the WiFi access point to the master device 110. The first channel and the second channel may be the same or different channels. The types of channel may refer to one or both of the first channel or the second channel. The channel type of the first channel may be determined by the satellite device 120*a* (or each of the satellite devices 120, as some of the satellite devices 120 may be connected to different access points with different channel types). The channel type of the first channel may be transmitted by the satellite device 120*a* to the master device 110. The channel type for the second channel may be determined by the master device 110. With respect to whether QoS may be supported by the network 150, whether the first channel supports QoS and whether the second channel supports QoS may also be determined by the satellite device 120*a* and the master device 110, respectively. For example, even though the satellite device 120*a* may support QoS, the access point may not support QoS for the first channel.

The satellite device 120*a* may send the device capability of the satellite device 120*a* and/or channel conditions (determined by the satellite device 120*a* for the first channel between the satellite device 120*a* and the access point) to the master device 110 when an active session is being established. The satellite device 120*a* may obtain one or more of the device capability of the satellite device 120*a* or channel conditions from an associated access point and relay such information to the master device 110. In some embodiments, the satellite device 120*a* may transmit such data to the master device 110 every time a new active session is being established (in other words, between different active sessions). In further or alternative embodiments, the satellite device 120*a* may transmit such data to the master device 110 during the active session (after the active participant session is established) in response to (or triggered by) a change in the device capability of the satellite device 120*a* or channel conditions. Similarly, the master device 110 may determine its own device capabilities and/or channel conditions (determined by the master device 110 for the second channel between the access point and the master device 110).

Next at block B420, the processor 220 of the master device 110 may determine the de-jitter buffer size based on the at least one of the device capabilities of the satellite device 120*a*, the device capabilities of the master device 110, or channel conditions. In some embodiments, the processor 220 may determine the de-jitter buffer size based on a predetermined mapping (e.g., the mapping table 300) between the predetermined de-jitter buffer size associated with one or more of the device capabilities of the satellite device 120*a*, device capabilities of the master device 110, or channel conditions. For example, the variables (corresponding to columns 310-340) as determined in block B420 may be entered, and a corresponding result (column 350) may be determined by the processor 220 based on the mapping table 300.

Next at block B430, the processor 220 of the master device 110 may apply the de-jitter buffer having the determined de-jitter buffer size.

Figure 5:
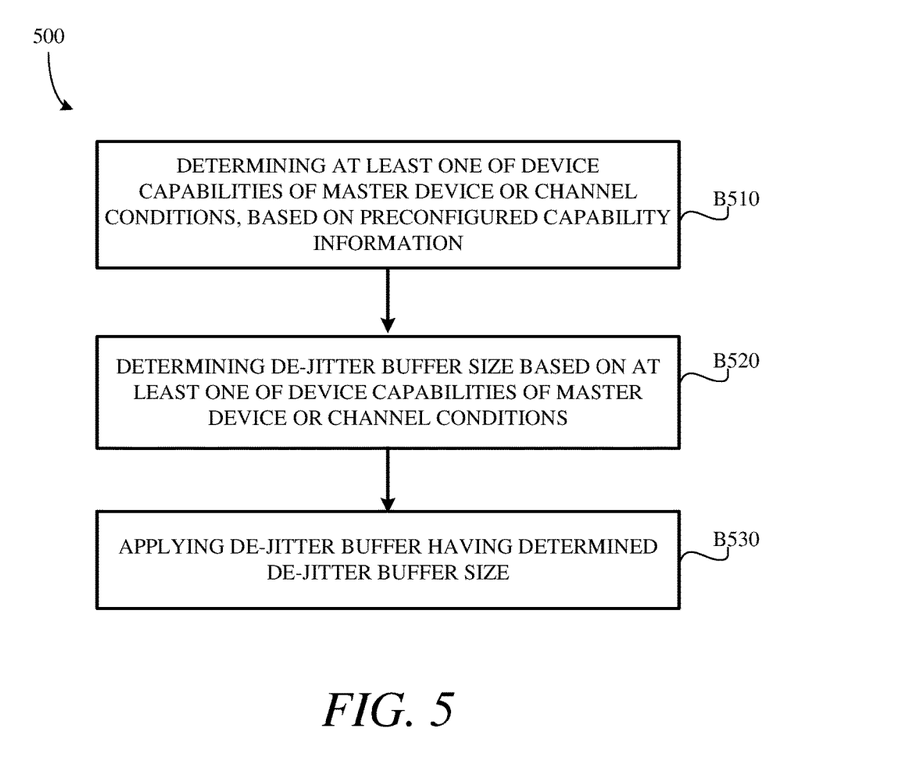
FIG. 5 is a process flowchart illustrating an example of a de-jitter buffer size selection method according to various embodiments.

FIG. 5 is a process flowchart illustrating an example of a de-jitter buffer size selection method 500 according to various embodiments. Referring to FIGS. 1-5, the method 500 may be implemented for the VCS 100, in which at least the master device 110 and the satellite devices 120 may be implemented with the PCD 200. The process 500 may be implemented for the master device 110. The method 500 may be performed by the processor 220 (as coupled to the network device 240 and the memory device 230) of the master device 110. The method 500 may not take into account device capabilities for the satellite device 120*a*.

At block B510, the processor 220 of the master device 110 may determine at least one of the device capabilities of the master device 110 or channel conditions, based on preconfigured capability information. The device capabilities of the master device 110 may include whether QoS is supported on the master device 110. The channel conditions may include network environmental factors such as, but not limited to, types of channel (e.g., which of the 2.4 GHz channel or the 5 GHz is being used), and the like. For example, a configuration file having preconfigured capability information about the device capabilities of the master device 110 and the channel conditions may be stored in the memory unit 230. The preconfigured capability information may be determined automatically by the processor 220 of the master device 110. The preconfigured capability information may be determined based on user input received via the user interface device 250. Alternatively, the preconfigured capability information may be received from another server (e.g., a host server or the bridge 140).

Next at block B520, the processor 220 of the master device 110 may determine the de-jitter buffer size based on the at least one of the device capabilities of the master device 110 or channel conditions. In other words, the processor 220 of the master device 110 may determine the de-jitter buffer size based on the preconfigured capability information. In some embodiments, the processor 220 may determine the de-jitter buffer size based on a predetermined mapping (e.g., the mapping table 300 without columns 320, 340, as information related to the satellite device 120*a* may not be used in the determination) between the predetermined de-jitter buffer size associated with one or more of the device capabilities of the master device 110 or channel conditions. For example, the variables as determined in block B510 may be entered, and a corresponding result may be determined by the processor 220 based on the mapping table.

Next at block B530, the processor 220 of the master device 110 may apply the de-jitter buffer having the determined de-jitter buffer size.

Figure 6:
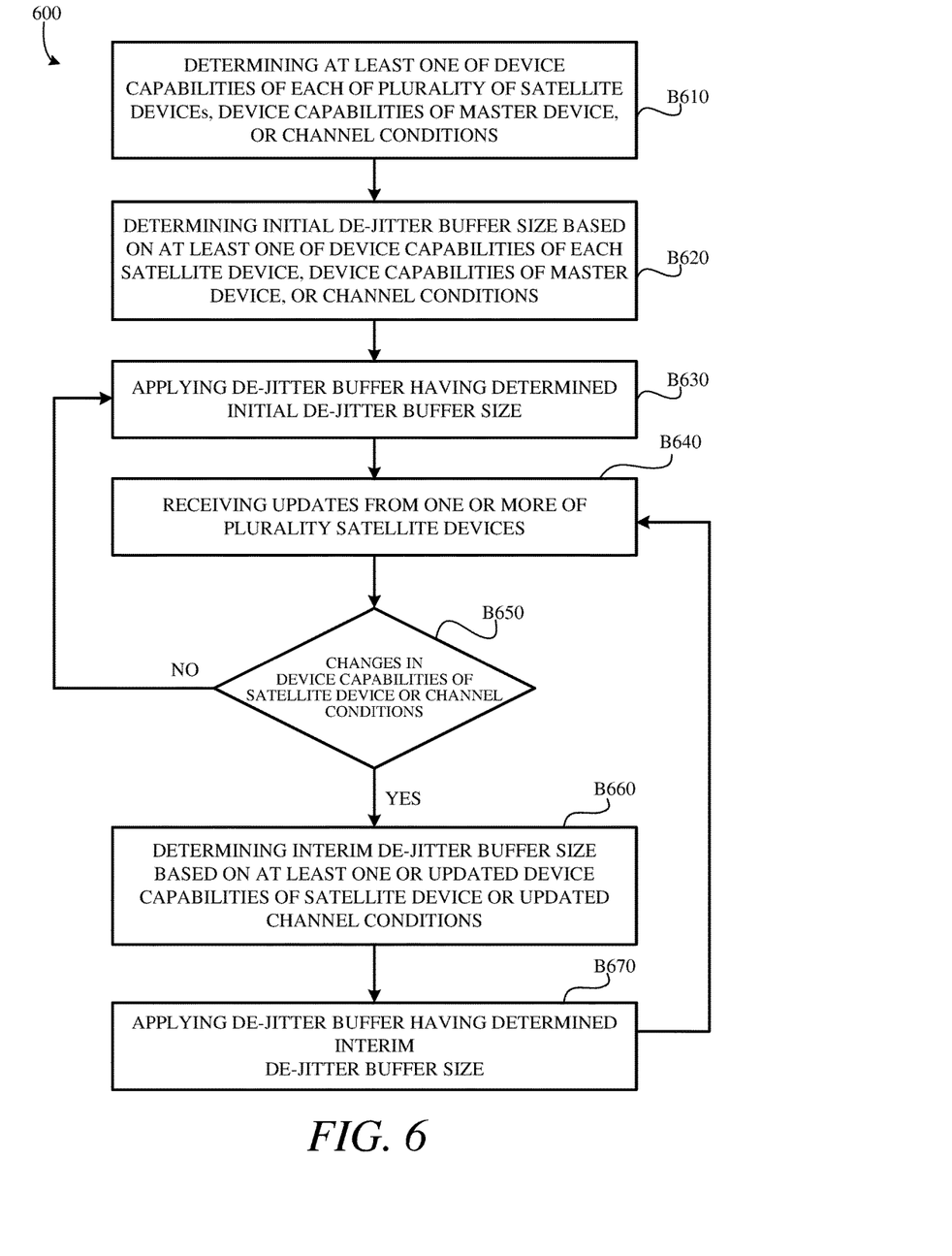
FIG. 6 is a process flowchart illustrating an example of a de-jitter buffer size selection method according to various embodiments.

FIG. 6 is a process flowchart illustrating an example of a de-jitter buffer size selection method 600 according to various embodiments. Referring to FIGS. 1-6, the method 600 may be implemented for the VCS 100, in which at least the master device 110 and the satellite devices 120 may be implemented with the PCD 200. The method 600 may be implemented for the master device 110. The method 600 may be performed by the processor 220 (as coupled to the network device 240 and the memory device 230) of the master device 110.

At block B610, the processor 220 of the master device 110 may determine at least one of device capabilities of each of a plurality of satellite devices 120, the device capabilities of the master device 110, or channel conditions. In some embodiments, the device capabilities of each of the plurality of satellite devices 120 may include whether QoS is supported on each of the satellite devices 120, whether Bluetooth is activated on each of the satellite devices 120, and the like. In some embodiments, the device capabilities of the master device 110 may include whether QoS is supported on the master device 110. The device capabilities of the master device 110 may be determined locally by the processor 220 of the master device 110. The device capabilities of the master device 110 may be stored in the memory unit 230 for repeated use. The channel conditions may include network environmental factors such as, but not limited to, types of channel (e.g., which of the 2.4 GHz channel or the 5 GHz is being used), whether QoS is supported by the network 150, and the like.

The network 150 may include a first channel from one of the satellite devices 120 to the WiFi access point and a second channel from the WiFi access point to the master device 110. The first channel and the second channel may be the same or different channels (or types of channels). The first channels of the satellite devices 120 may also be the same or different channels (or types of channels). The types of channel may refer to one or both of the first channel or the second channel. The channel type of the first channel may be determined by the satellite devices 120. The channel type of the first channel may be transmitted by each of the satellite devices 120 to the master device 110. The channel type for the second channel may be determined by the master device 110. With respect to whether QoS may be supported by the network 150, whether the first channel supports QoS and whether the second channel supports QoS may also be determined by the satellite devices 120 or the master device 110, respectively. For example, even though at least some of the satellite devices 120 may support QoS, the access point may not support QoS for some of the first channels.

Each of the plurality of satellite devices 120 may transmit its own device capabilities and/or the channel conditions (determined by each of the satellite devices 120 for the first channel between the satellite device 120*a* and the access point) to the master device 110 via control signals when the active session is being established. In some embodiments, the satellite devices 120 may transmit such data to the master device 110 every time a new active session is being established. The satellite devices 120 may obtain one or more of the device capability of the satellite devices 120 as well as channel conditions from an associated access point and relay such information to the master device 110. Similarly, the master device 110 may determine its own device capabilities and/or channel conditions (determined by the master device 110 for the second channel between the access point and the master device 110).

Next at block B620, the processor 220 of the master device 110 may determine an initial de-jitter buffer size based on the at least one of the device capabilities of each satellite devices 120, device capabilities of the master device 110, or channel conditions. In some embodiments, the processor 220 of the master device 110 may determine the initial de-jitter buffer size based on a predetermined mapping (e.g., the mapping table 300) between the predetermined de-jitter buffer size associated with one or more of the device capabilities of each of the satellite devices 120, device capabilities of the master device 110, or channel conditions. For example, the variables (e.g., one or more or all of the device capabilities of each satellite devices 120, the device capabilities of the master device 110, or channel conditions) as determined in block B610 may be entered, and a corresponding result may be determined by the processor 220 based on the mapping table 300.

Given the plurality of satellite devices 120 are present in the VCS 100, the satellite device capabilities and/or the channel conditions for each of the satellite devices 120 may be considered together. In some embodiments, the worst satellite device capabilities and/or the worst channel conditions may be used (as the entered parameters for the mapping table 300) in determining the mapping to the initial de-jitter buffer size. For example, when all of the satellite devices 120 are provided with QoS except one, the parameter used for mapping (e.g., at the Satellite QoS column 320) may be "NO." In other embodiments, the satellite device capabilities and/or the channel conditions worse than a predetermine percentage of satellite devices 120 (e.g., 75%, 80%, 90%, 95%, or the like) may be used in determining the mapping to the initial de-jitter buffer size.

Next at block B630, the processor 220 of the master device 110 may apply the initial de-jitter buffer having the determined de-jitter buffer size. Next at block B640, the network device 240 (as configured by the processor 220 for receiving data) may be configured to receive updates from one or more of the plurality of satellite devices 120. Such updates may be periodic updates from each of the satellite devices 120 and include current device capabilities of each of the satellite devices 120 and/or the channel conditions currently measured by each of the satellite devices 120. Next at block B650, the processor 220 may determine whether there has been a change in the device capabilities or the channel conditions based on the update. When the processor 220 determines that no change has occurred, the processor 220 may continue to apply the initial de-jitter buffer size, at block B630 (B650: NO). When the processor 220 determines that there has been at least one change, the processor 220 may implement block B660 (B650: YES). Alternatively, one of the plurality of satellite devices 120 may send a update to the master device 110 only when that satellite device 120*a* detects a change in the device capabilities and/or channel conditions at block B640 (B650: ALWAYS YES).

For example, in a same active session, one of the plurality of satellite devices 120, which has QoS enabled, may move from a first access point (does not support QoS) to another access point (supports QoS). As such, a change in device capabilities associated with that satellite device 120*a* may result. In addition, the updates and/or changes may also include at least one additional satellite device joining the active session. Given that the de-jitter buffer size may be determined by considering the satellite device capabilities and/or the channel conditions for all of the plurality of satellite devices 120 in the same active session, an additional device may cause a change in the collective values of the satellite device capabilities and/or the channel conditions. Subsequently, the parameter value used for the mapping table 300 may also change. This may be especially important when the newly joined satellite device has the worst satellite device capabilities and/or the channel conditions.

At block B660, the processor 220 of the master device 110 may determine an interim de-jitter buffer size based on at least one updated device capabilities of one of the satellite devices 120 or updated channel conditions. The processor 220 of the master device 110 may use the updated values and the unchanged values to determine the interim de-jitter buffer size based on the mapping table (e.g., the mapping table 300), in the manner described. A new or unchanged de-jitter buffer size may result.

Next at block B670, the processor 220 of the master device 110 may apply the de-jitter buffer having the determined interim de-jitter buffer size. The processor 220 of the master device 110 may continue to monitor for (receive) updates from one or more of the plurality of satellite devices 120, at block B640, after applying the interim de-jitter buffer size. In various embodiments, the determining of the interim de-jitter buffer size and the applying of the interim de-jitter buffer size may be performed in a same active session as the determining of the initial de-jitter buffer size and the applying of the initial de-jitter buffer size. In other embodiments, the determining of the interim de-jitter buffer size and the applying of the interim de-jitter buffer size may be performed in a different active session as the determining of the initial de-jitter buffer size and the applying of the initial de-jitter buffer size.

With respect to retransmission count and latency budget, each of the satellite devices 120 may determine whether an audio frame is a silence frame or a voice frame using energy-based classification with Pulse-Code Modulation (PCM). Silence frames may be associated with lower retransmission priority (lower retransmission count and/or lower latency budget). The MAC layer may determine transmission counts based on a type of access class (e.g., background, best effort, video, audio, and the like) associated with the data packet. An application executed by the processor 220 of each of the satellite devices 120 may be used to further differentiate priority within a same access class (e.g., audio). For example, voice frames may be associated with higher retransmission count (larger number of retries) and higher latency budget (more resistance to latency in the network 150) as compared to silence frames. As such, when the network is considerably burdened with undelivered data packets, the undelivered silence frames will not significantly negatively impact the transmission/retransmission of the voice frames, which carries actual voice data from the user of the satellite device 120a.

A media access control (MAC) layer of the PCDs 200 (e.g., the satellite devices 120) may determine a retransmission count for each uplink data packet (e.g., media access control protocol data units (MPDUs), media packets, or the like) for a given access category. The MAC layer retransmission count may be determined based on the access class of the data packet. An upper layer may mark audio data packets with priority. The upper layer may also be configured to provide a delay bound for each flow and/or data packet. Appropriately selecting retransmission count and latency budget may be important issues for the VCS using PCD-implemented satellite devices 120.

Figure 7:
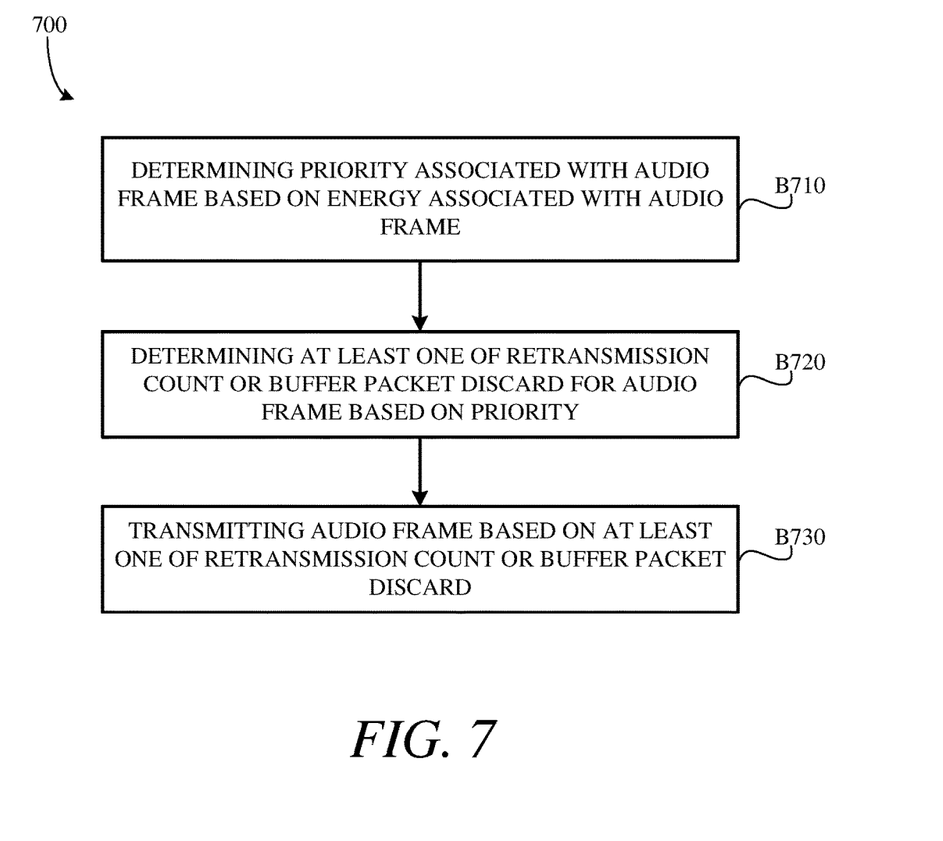
FIG. 7 is a process flowchart illustrating an example of a data transmission method according to various embodiments.

FIG. 7 is a process flowchart illustrating an example of a data transmission method 700 according to various embodiments. Referring to FIGS. 1-7, the data transmission method 700 may be performed by the processor 220 (as coupled to the network device 240 and the memory device 230) of the satellite device 120a implementing the MAC layer. The MAC layer retransmission count may be determined based on whether the audio packet is a speech frame or a silence frame. The MAC layer retransmission count may also be determined based on the feedback received from the master device 110 of the VCS 100, in which at least the master device 110 and the satellite devices 120 may be implemented with the PCD 200.

At block B710, the processor 220 of the satellite device 120a (one of the satellite devices 120) may determine a priority associated with an audio frame based on energy associated with the audio frame. The priority may a transmission priority. The transmission priority may be determined based on energy associated with the audio frame as well as other criteria such as, but not limited to, a signal-to-noise-ratio (SNR), background noise, interference, a combination thereof, and/or the like. The processor 220 of the satellite device 120a may determine an energy (using PCM) associated with the audio frame, at application layer. When the energy associated with the audio frame crosses one or more predetermined thresholds, the audio frame may be assigned a corresponding priority. Illustrating with a non-limiting example, when the energy associated with the audio frame exceeds a predetermined threshold, the audio frame may be classified as a voice frame associated with a higher transmission priority. On the other hand, when the energy associated with the audio frame is below the predetermined threshold, the audio frame may be classified as a silence frame associated with a lower transmission priority. It should be understood that additional thresholds may define three or more classifications of the audio frames based on energy level. Higher transmission priority may be associated with higher energy levels, vice versa. In other embodiments, the transmission priority may be determined with a vocoder.

Alternatively or in addition, the transmission priority may correspond to a delay bound (delay tolerance upper bound) determined for the audio frame. The processor 220 (implementing the upper layers) may determine the delay bound for the audio frame based on the energy associated with the audio frame. Illustrating with a non-limiting example, when the energy associated with the audio frame exceeds a predetermined threshold, the audio frame may be designated a larger delay bound (given the audio frame is a voice frame). On the other hand, when the energy associated with the audio frame is below the predetermined threshold, the audio frame may be designated a lesser delay bound (given the audio frame is a silence frame). Additional thresholds may define three or more intervals of delay bounds.

Next at block B720, the processor 220 (implementing the MAC layer) of the satellite device 120a may determine at least one of retransmission count or buffer packet discard for the audio frame based on the priority associated with the audio frame. In particular, the MAC layer may determine the retransmission count based on the transmission priority. Higher transmission priority may correspond to higher transmission count. For example, a voice frame may benefit from a full retransmission count (e.g., 6, 7, or the like). On the other hand, a silence frame may be associated with a lower retransmission count (e.g., 1 or 2). Given that the retransmission count may also be dependent on factors (e.g., SNR, background noise, interference, and the like), the retransmission count based solely on frame energy may be adopted as long as other factors do not alter the retransmission count. Otherwise, the retransmission count determined based on only frame energy may be adjusted based on the other factors. The MAC layer may also determine the buffer packet discard for the audio frame based on the delay bound associated with the audio frame.

The MAC layer may determine the retransmission count and MAC buffer packet discard based on the delay bound. For example, silence frames may be assigned a lower buffer packet discard (e.g., first discarded when the buffer is full or almost full). On the other hand, voice frames may be assigned a higher buffer packet discard (e.g., discarded after the audio frames with lower buffer packet discards have been discarded when the buffer is full or almost full).

Next at block B730, the network device 240 of the satellite device 120a (configured by the processor 220) may transmit the audio frame as at least one uplink data packet based on (with) the at least one of retransmission count and/or buffer packet discard, in the active session as the uplink data packets.

Data communication between satellite devices 120 and the master device 110 may be implemented using multicast, unicast, or a combination thereof. WiFi multicast may can be efficient and scalable as compared to unicast. However, WiFi multicast may be less reliable given that transmissions from an access point to a receiving station (e.g., one or more of the satellite devices 120 and master device 110) may not be Acknowledged (ACKed). In addition, when any of the receiving stations associated with a given access point enters into power saving mode (not receiving multicast traffic), the access point may buffer multicast traffic and transmit such traffic to every Delivery Traffic Indication Message (DTIM). Therefore, a method of communication between the satellite devices 120 and the master device 110 may dynamically utilize both multicast and unicast in the manner described.

Figure 8:
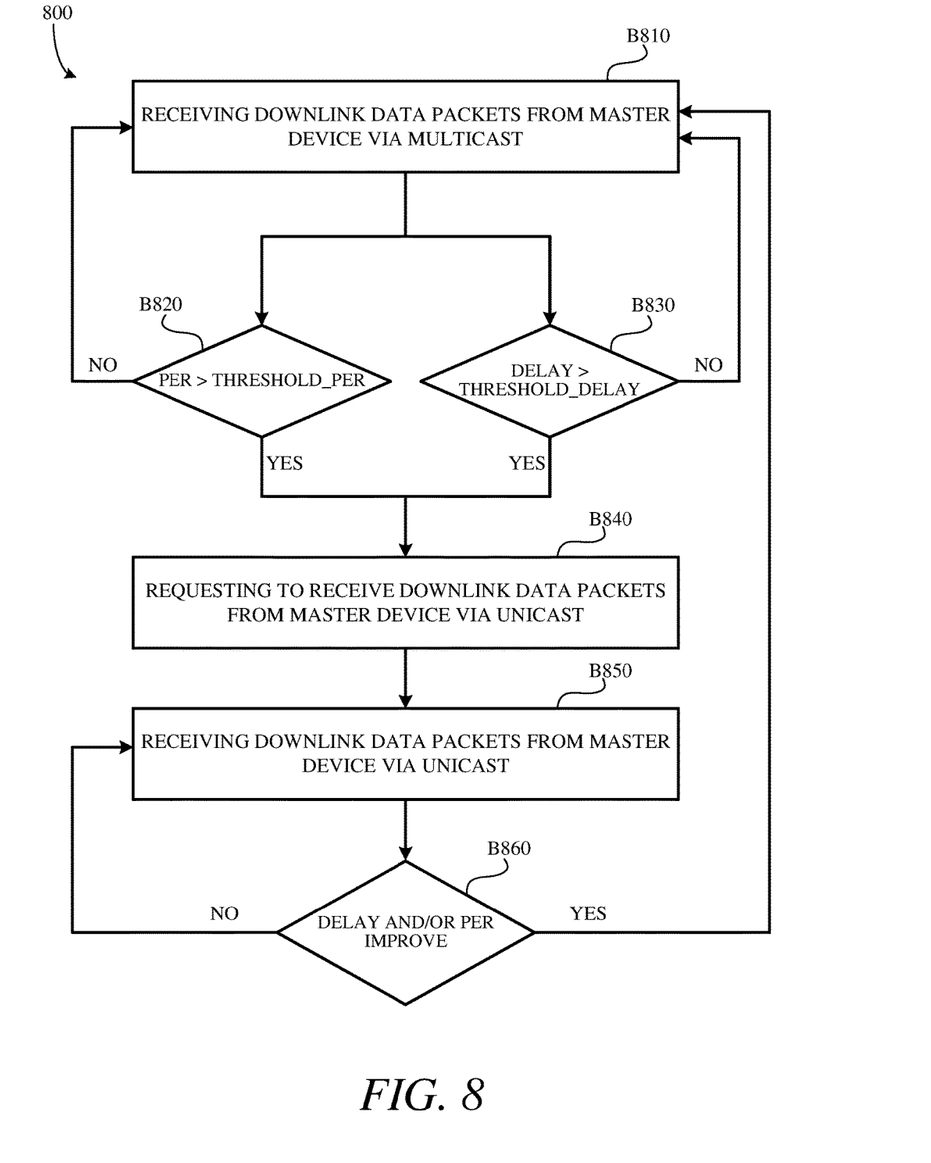
FIG. 8 is a process flowchart illustrating an example of a multicast-unicast selection method according to various embodiments.

FIG. 8 is a process flowchart illustrating an example of a multicast-unicast selection method 800 according to various embodiments. Referring to FIGS. 1-8, the method 800 may be implemented for the VCS 100, in which at least the master device 110 and the satellite devices 120 may be implemented with the PCD 200. The method 800 may be implemented for one of the satellite devices 120 (e.g., the satellite device 120a). The method 800 may be performed by the processor 220 (as coupled to the network device 240 and the memory device 230) of the satellite device 120a.

At block B810, the network device 240 of the satellite device 120a (as configured by the processor of the satellite device 120a) may receive downlink data packets from the master device 110 via multicast. The downlink data packets may originate from the remote devices In other words, the master device 110 may always be configured to transmit the downlink data packets using multicast at least initially.

At block B820, the processor 220 of the satellite device 120a may determine whether a Packet Error Rate (PER) exceeds a predetermined PER threshold (threshold_PER). The PER may be a measured error rate of the downlink data packets received from the master device 110. Examples of the threshold_PER may be, for example, 10%, 20%, 30%, 45%, or the like.

At block B830, the processor 220 of the satellite device 120a may determine whether a packet reception delay (Delay) exceeds a predetermined packet reception delay threshold (threshold_Delay). For example, the processor 220 may determine the Delay by comparing a reception timestamp (determined by the processor 220 of the satellite device 120a) associated with a downlink data packet and a generation timestamp (determined by the processor 220 of the master device 110 and transmitted with the downlink data packet to the satellite device 120a) associated with the same downlink data packet. Examples of the threshold_Delay may include, for example, 2 ms, 5 ms, 10 ms, 20 ms, or the like.

When the PER exceeds the threshold_PER (B820: YES) or when the Delay exceeds the threshold_Delay (B830: YES), the processor 220 of the satellite device 120a may (via the network device 240 of the satellite device 120a) send a request to the master device 110 requesting to receive (subsequent) downlink data packets from the master device 110 via unicast, at block B840. Otherwise (e.g., when the PER does not exceed the threshold_PER (B820: NO) and when the Delay does not exceed the threshold_Delay (B830: NO)), the satellite device 120a may be configured to continue to receive downlink data packets from the master device 110 via multicast, at block B810.

At block B850, the satellite device 120a may receive downlink data packets from the master device 110 via unicast. In response to receiving the request from the satellite device 120a, the master device 110 may transmit the downlink data packets to the requesting satellite device 120a via unicast. Therefore, some of the satellite devices 120 may receive via multicast and some other of the satellite devices 120 (e.g., the satellite device 120a) may receive via unicast, upon such requests.

At block B860, the satellite device 120a may determine whether the PER and/or the Delay have improved. In particular, the satellite device 120a may determine (periodically) whether the PER no longer exceed the threshold_PER or whether the Delay no longer exceed the threshold_Delay. No longer exceeding the thresholds may indicate improvement. When improvement with at least one or both of PER or Delay is detected, the satellite device 120a may request suspension of unicast in favor of receiving via multicast at block B810 (B860: YES). On the other hand, when no improvement has been found, the satellite device 120a may continue to receive via unicast at block B850 (B860: NO).

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a DSP, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Various modifications to embodiments described herein will be readily apparent to those skilled in the art, and the generic principles defined herein may be applied to some embodiments without departing from the spirit or scope of the disclosure. Thus, the present disclosure is not intended to be limited to the embodiments shown herein but is to be accorded the widest scope consistent with the following claims and the principles and novel features described herein.

What is claimed is:

1. A method for facilitating communications between a master device and a satellite device in a conferencing venue using a wireless access point, the method performed by the satellite device and comprising:
    determining an initial priority associated with an audio frame based on a type of access class associated with the audio frame;
    determining a specific priority associated with the audio frame, wherein the specific priority is based on the initial priority and an energy level associated with the audio frame, wherein the specific priority indicates a differentiation between priorities associated with frames within the same access class;
    determining at least one of a retransmission count or a buffer packet discard for the audio frame based on the specific priority; and
    transmitting, to the master device via the wireless access point, the audio frame based on the at least one of the retransmission count or the buffer packet discard, wherein the wireless access point is physically located within the conferencing venue.

2. The method of claim 1, wherein the specific priority comprises at least one of a transmission priority or a delay bound.

3. The method of claim 2, wherein determining the transmission priority comprises:
    determining the energy level associated with the audio frame;
    assigning the audio frame as a voice frame if the energy level is greater than a predetermined threshold; and
    assigning the audio frame as a silence frame if the energy level is less than the predetermined threshold.

4. The method of claim 3, further comprising:
    assigning a first transmission priority or a first delay bound when the audio frame is the voice frame; and
    assigning a second transmission priority or a second delay bound when the audio frame is the silence frame, wherein:
        the first transmission priority is higher than the second transmission priority, the first delay bound is greater than the second delay bound, and the first transmission priority and the second transmission priority are associated with the initial priority.

5. The method of claim 4, wherein determining at least one of the retransmission count or determining the buffer packet discard for the audio frame based on the priority comprises at least one from the group consisting of:
    assigning a higher transmission count to the audio frame when the transmission priority is higher; and
    assigning a larger buffer packet discard to the audio frame when the delay bound is higher.

6. The method of claim 1, further comprising:
    receiving downlink data packets from the master device;
    requesting to receive additional downlink data packets from the master device via unicast; and
    receiving the additional downlink data packets from the master device via unicast.

7. The method of claim 6, further comprising:
    determining whether a packet error rate associated with the downlink data packets is greater than a predetermined packet error rate threshold; and
    requesting to receive, via unicast, additional downlink data packets when the packet error rate exceeds the predetermined packet error rate threshold.

8. The method of claim 6, further comprising:
    determining whether a packet reception delay associated with the downlink data packets is greater than a predetermined packet reception delay threshold; and
    requesting to receive, via unicast, additional downlink data packets when the packet reception delay exceeds the predetermined packet reception delay threshold.

9. The method of claim 8, wherein the packet reception delay is determined by comparing a generation timestamp received from the master device with a reception timestamp determined by the satellite device.

10. The method of claim 8, further comprising:
    determining, based on the packet reception delay, whether or not to continue receiving packets via unicast.

11. The method of claim 8, further comprising:
    determining, based on the packet reception delay, whether or not to request to receive packets via multicast.

12. A system for facilitating communications between a master device and a satellite device in a conferencing venue using a wireless access point, the system comprising:
    one or more processors; and
    a memory storing instructions that, when executed by the one or more processors, cause the system to:
        determine an initial priority associated with an audio frame based on a type of access class associated with the audio frame;
        determine a specific priority associated with the audio frame, wherein the specific priority is based on the initial priority and an energy level associated with the audio frame, wherein the specific priority indicates a differentiation between priorities associated with frames within the same access class;

determine at least one of a retransmission count or a buffer packet discard for the audio frame based on the specific priority; and transmit, to the master device via the wireless access point, the audio frame based on the at least one of the retransmission count or the buffer packet discard, wherein the wireless access point is physically located within the conferencing venue.

13. The system of claim 12, wherein the specific priority comprises at least one of a transmission priority or a delay bound.

14. The system of claim 13, wherein execution of the instructions for determining the transmission priority causes the system to:

determine the energy level associated with the audio frame;

assign the audio frame as a voice frame if the energy level is greater than a predetermined threshold; and assign the audio frame as a silence frame if the energy level is less than the predetermined threshold.

15. The system of claim 14, wherein execution of the instructions further cause the system to:

assign a first transmission priority or a first delay bound when the audio frame is the voice frame; and assign a second transmission priority or a second delay bound when the audio frame is the silence frame, wherein:

the first transmission priority is higher than the second transmission priority, the first delay bound is greater than the second delay bound, and the first transmission priority and the second transmission priority are associated with the initial priority.

16. The system of claim 15, wherein execution of the instructions for determining at least one of the retransmission count or the buffer packet discard causes the system to perform at least one from the group consisting of:

assign a higher transmission count to the audio frame when the transmission priority is higher; and assign a larger buffer packet discard to the audio frame when the delay bound is higher.

17. The system of claim 12, wherein execution of the instructions further cause the system to:

receive downlink data packets from the master device;

request to receive additional downlink data packets from the master device via unicast; and receive the additional downlink data packets from the master device via unicast.

18. The system of claim 17, wherein execution of the instructions further cause the system to:

determine whether a packet error rate associated with the downlink data packets is greater than a predetermined packet error rate threshold; and request to receive, via unicast, additional downlink data packets when the packet error rate exceeds the predetermined packet error rate threshold.

19. A non-transitory computer readable medium comprising instructions that, when executed by one or more processors of a system, cause the system to facilitate communications between a master device and a satellite device in a conferencing venue using a wireless access point by performing operations comprising:

determining an initial priority associated with an audio frame based on a type of access class associated with the audio frame;

determining a specific priority associated with the audio frame, wherein the specific priority is based on the initial priority and an energy level associated with the audio frame, wherein the specific priority indicates a differentiation between priorities associated with frames within the same access class;

determining at least one of a retransmission count or a buffer packet discard for the audio frame based on the specific priority; and transmitting, to the master device via the wireless access point, the audio frame based on the at least one of the retransmission count or the buffer packet discard, wherein the wireless access point is physically located within the conferencing venue.

20. The non-transitory computer readable medium of claim 19, wherein the specific priority comprises at least one of a transmission priority or a delay bound.

* * * * *